(No Model.)
W. FRISHMUTH.
GALVANIC BATTERY.
No. 404,699. Patented June 4, 1889.
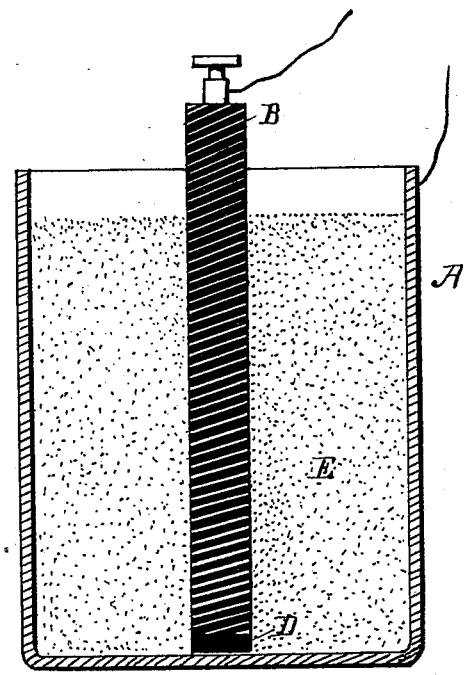
WITNESSES:
Fred Kemper
M. Rosch
INVENTOR:
William Frishmuth
BY Park Benjamin
his ATTORNEYS.

UNITED STATES PATENT OFFICE.

WILLIAM FRISHMUTH, OF PHILADELPHIA, PENNSYLVANIA.

GALVANIC BATTERY.

SPECIFICATION forming part of Letters Patent No. 404,699, dated June 4, 1889.

Application filed November 8, 1888. Serial No. 290,323. (No model.)

*To all whom it may concern:*

Be it known that I, WILLIAM FRISHMUTH, of Philadelphia, Philadelphia county, Pennsylvania, have invented a new and useful Improvement in Galvanic Cells, of which the following is a specification.

My invention relates to that form of a galvanic cell commonly known as a "dry battery," wherein the depolarizer is combined with a solid porous absorbent material in granular or comminuted form.

The accompanying drawing is a sectional view of a cell containing my said prepared material.

A is the outer or containing vessel of the cell, which is made of zinc, and which in itself forms one electrode. The outer surface of said vessel is varnished or protected in any suitable way from the atmosphere, and to it one of the conducting-wires from the cell is to be secured in any suitable way. B is the other electrode, here shown as a rod of carbon. The bottom of the vessel A may be of rubber or other insulating material, or to the lower end of the carbon rod B may be secured a tip D, of like material, as shown, the object in either case being to prevent contact of the electrodes. To the upper end of the rod B the other conducting-wire from the cell is secured in any suitable way.

The depolarizing substance may be of any known variety or varieties; but preferably I employ a bichromate of potash in solution—such as electropoion fluid. I prepare this in connection with absorbent material for use in the cell in the following manner: I first grind pumice-stone into granulated form. This I saturate with the bichromate solution, and then dry at heat sufficient to drive off the water. The space between the electrodes is packed with this dry material, as at E. In order to make the cell ready for operation, it is necessary simply to moisten the dry pumice-stone with water.

I am well aware that cells have been constructed in which a granulated or comminuted solid is packed between the electrodes and moistened with an electrolytic liquid. The substances most commonly used as the solid are sawdust, mineral wool, asbestus, and sand. Sawdust is attacked by the acids commonly employed, and becomes carbonized and dissolved, forming a pasty mass. Its resistance is excessively high, especially when soaked and expanded by a liquid. It needs constant renewal, and when acted upon by the acids the cell requires frequent cleansing. It is not, of course, in any sense refractory. After absorption of a depolarizer and desiccation the material seems to become inclosed in it and can be soaked out only with much difficulty and delay. Sand is not an absorbent at all. It is not porous. It cannot be permeated by the depolarizer. It adds simply to the weight of the battery. It simply holds a liquid between the interstices of its particles, and there can be no combination of the depolarizer with it. It is also more or less attackable by acids, and forms a mud in the cell. Asbestus and mineral wool are open to the same objections. Both of these substances give off large amounts of fine particles, which form a dense and practically non-conducting mass, which greatly augments the internal resistance of the cell.

I have discovered by actual experiment that pumice-stone in comminuted form is free from the above-named disadvantages. It is exceedingly light, and therefore it does not add appreciably to the weight of the cell. It is highly porous, even in its minutest subdivisions, absorbs the depolarizer or other active substances in solution in the electrolytic liquid into every pore, and may then be subjected to any desired heat or to any process to insure desiccation of said substances. When the fluid is added—and this fluid, as already stated, may be merely water—its effect is to dissolve the substances out of the pores of the pumice gradually, so that the strength of the solution is kept up for a long time, or until the pumice-stone is completely free from the substances in it. Pumice-stone is wholly unattackable by acids, and is non-conducting. It is excessively hard, and does not become ground fine in the cell, so as to form mud or paste.

The combination of depolarizing substances and pumice-stone prepared as above described can be supplied to the market as an article of manufacture.

I claim—

1. As a new article of manufacture, a non-conducting porous insoluble refractory solid in dry comminuted form, containing in its pores a substance or substances capable of acting as a depolarizer in a galvanic cell, substantially as described.

2. As a new article of manufacture, pumice-stone in dry comminuted form, containing in its pores a substance or substances capable of acting as a depolarizer in a galvanic cell, substantially as described.

3. As a new article of manufacture, pumice-stone in dry comminuted form, containing in its pores bichromate of potash, substantially as described.

4. In combination with the electrodes of a galvanic cell, a mass of pumice-stone in comminuted form interposed between said electrodes, containing in its pores a depolarizing substance, and saturated with an electrolytic solvent of said substance, substantially as described.

WILLIAM FRISHMUTH.

Witnesses:
 E. H. BAILEY,
 WM. F. GARTY.